(12) United States Patent
Fix et al.

(10) Patent No.: US 10,988,632 B2
(45) Date of Patent: Apr. 27, 2021

(54) COATING COMPOSITION

(71) Applicant: PPG Industries Ohio, Inc., Cleveland, OH (US)

(72) Inventors: Katlyn M. Fix, Amelia, OH (US); Keri M. Veres, Milford, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 238 days.

(21) Appl. No.: 15/987,963

(22) Filed: May 24, 2018

(65) Prior Publication Data
US 2019/0359846 A1  Nov. 28, 2019

(51) Int. Cl.
| | | |
|---|---|---|
| *C09D 167/02* | (2006.01) | |
| *C08G 8/10* | (2006.01) | |
| *C08G 18/80* | (2006.01) | |
| *C08J 3/24* | (2006.01) | |

(52) U.S. Cl.
CPC ............ *C09D 167/02* (2013.01); *C08G 8/10* (2013.01); *C08G 18/80* (2013.01); *C08J 3/24* (2013.01)

(58) Field of Classification Search
None
See application file for complete search history.

(56) References Cited

U.S. PATENT DOCUMENTS

2006/0093768 A1* 5/2006 Parekh ................. C08G 18/423
                                                              428/35.8
2011/0274922 A1    11/2011 Yasue

FOREIGN PATENT DOCUMENTS

| JP | 2018047682 A | 3/2018 |
|---|---|---|
| WO | 2004013240 A1 | 2/2004 |

* cited by examiner

*Primary Examiner* — Shamim Ahmed
*Assistant Examiner* — Bradford M Gates
(74) *Attorney, Agent, or Firm* — Diane R. Meyers

(57) ABSTRACT

A coating composition comprising
  a polyester blend comprising
    a first polyester material having a Tg of from 55 to 105° C., the first polyester material being present in the polyester blend in an amount of 60 to 90 wt % (based on solids);
    a second polyester material having a Tg of from −10 to 25° C., the second polyester material being present in the polyester blend in an amount of 10 to 40 wt % (based on solids); and
  a crosslinking system comprising
    a) an amine crosslinking material;
    b) a phenolic crosslinking material;
    c) an isocyanate crosslinking material.

19 Claims, No Drawings

COATING COMPOSITION

FIELD OF THE INVENTION

The present invention relates to a coating composition comprising a polyester blend and a crosslinking system. The invention also extends to a method of coating a metal can with the coating composition, and a metal can coated on at least a portion thereof with a coating derived from the coating composition.

BACKGROUND OF THE INVENTION

A wide variety of coatings have been used to coat metal cans, such as food and/or beverage cans. The coating systems typically have certain properties such as being capable of high speed application, having acceptable adhesion to the substrate, being safe for food contact and/or having properties that are suitable for their end use.

Many coating compositions contain bisphenol A (BPA). BPA is perceived as being harmful to human health and it is therefore desirable to eliminate it from coatings. Derivatives of BPA such as diglycidyl ethers of bisphenol A (BADGE), epoxy novolak resins and polyols prepared from BPA and bisphenol F (BPF) are also perceived to be problematic. Therefore, there is a desire to provide coating compositions which are free from BPA, BADGE and/or other derivatives, but which retain the required properties as described above.

SUMMARY OF THE INVENTION

The present invention is directed to a coating composition comprising
a polyester blend comprising a first polyester material having a Tg of from 55 to 105° C., the first polyester material being present in the polyester blend in an amount of 60 to 90 wt % (based on solids);
a second polyester material having a Tg of from −10 to 25° C., the second polyester material being present in the polyester blend in an amount of 10 to 40 wt % (based on solids); and
a crosslinking system comprising
a) an amine crosslinking material;
b) a phenolic crosslinking material;
c) an isocyanate crosslinking material.
Methods of coating metal cans with such compositions and cans coated at least in part with such a composition are also within the scope of the present invention.

DESCRIPTION OF THE INVENTION

The present invention is directed to a coating composition comprising
a) a polyester blend comprising
a first polyester material having a Tg of from 55 to 105° C., the first polyester material being present in the polyester blend in an amount of 60 to 90 wt % (based on solids);
a second polyester material having a Tg of from −10 to 25° C., the second polyester material being present in the polyester blend in an amount of 10 to 40 wt % (based on solids); and
b) a crosslinking system comprising
i) an amine crosslinking material;
ii) a phenolic crosslinking material; and
iii) an isocyanate crosslinking material.

As noted above, the polyester blend comprises a first and second polyester material. Each of the first and second polyester materials may comprise the reaction product of a polyacid and a polyol.

"Polyacid" and like terms as used herein refers to a compound having two or more carboxylic acid groups, such as two, three or four acid groups, and includes an ester of the polyacid (wherein one or more of the acid groups is esterified) or an anhydride. The polyacid is suitably an organic polyacid.

The carboxylic acid groups of the polyacid may be connected by a bridging group selected from: an alkylene group; an alkenylene group; an alkynylene group; or an arylene group.

The first and second polyester material may each, independently, be formed from any suitable polyacid. Suitable examples of polyacids include, but are not limited to the following: maleic acid; fumaric acid; itaconic acid; adipic acid; azelaic acid; succinic acid; sebacic acid; glutaric acid; decanoic diacid; dodecanoic diacid; phthalic acid; isophthalic acid; 5-tert-butylisophthalic acid; tetrachlorophthalic acid; tetrahydrophthalic acid; trimellitic acid; naphthalene dicarboxylic acid; naphthalene tetracarboxylic acid; terephthalic acid; hexahydrophthalic acid; methylhexahydrophthalic acid; dimethyl terephthalate; cyclohexane dicarboxylic acid; chlorendic anhydride; 1,3-cyclohexane dicarboxylic acid; 1,4-cyclohexane dicarboxylic acid; tricyclodecane polycarboxylic acid; endomethylene tetrahydrophthalic acid; endoethylene hexahydrophthalic acid; cyclohexanetetra carboxylic acid; cyclobutane tetracarboxylic; esters and anhydrides of all the aforementioned acids and combinations thereof.

"Polyol" and like terms, as used herein, refers to a compound having two or more hydroxyl groups, such as two, three or four hydroxyl groups. The hydroxyl groups of the polyol may be connected by a bridging group selected from: an alkylene group; an alkenylene group; an alkynylene group; or an arylene group. Suitably the polyol is an organic polyol.

The first and second polyester material may each, independently be formed from any suitable polyol. Suitable examples of polyols include, but are not limited to the following: alkylene glycols, such as ethylene glycol; propylene glycol; diethylene glycol; dipropylene glycol; triethylene glycol; tripropylene glycol; hexylene glycol; polyethylene glycol; polypropylene glycol and neopentyl glycol; hydrogenated bisphenol A; cyclohexanediol; propanediols including 1,2-propanediol; 1,3-propanediol; butyl ethyl propanediol; 2-methyl-1,3-propanediol; and 2-ethyl-2-butyl-1,3-propanediol; butanediols including 1,4-butanediol; 1,3-butanediol; and 2-ethyl-1,4-butanediol; pentanediols including trimethyl pentanediol and 2-methylpentanediol; cyclohexanedimethanol; hexanediols including 1,6-hexanediol; caprolactonediol (for example, the reaction product of epsilon-capro lactone and ethylene glycol); hydroxyalkylated bisphenols; polyether glycols, for example, poly(oxytetramethylene) glycol; trimethylol propane; pentaerythritol; di-pentaerythritol; trimethylol ethane; trimethylol butane; dimethylol cyclohexane; glycerol and the like or combinations thereof.

The first and second polyester material may each, independently, comprise polymers or copolymers formed from the reaction of diols and diacids, where polyols or polyacid components may optionally be used to produce branched polymers.

The first and second polyester material may each, independently, be formed from a diacid. Suitable examples of diacids include, but are not limited to the following: phthalic acid; isophthalic acid; terephthalic acid; 1,4 cyclohexane dicarboxylic acid; succinic acid; adipic acid; azelaic acid; sebacic acid; fumaric acid; 2,6-naphthalene dicarboxylic acid; orthophthalic acid; phthalic anhydride; tetrahydrophthalic anhydride; maleic anhydride; succinic anhydride; itaconic anhydride; di-ester materials, such as dimethyl ester derivatives for example dimethyl isophthalate, dimethyl terephthalate, dimethyl 1,4-cyclohexane dicarboxylate, dimethyl 2,6-naphthalene di carboxylate, dimethyl fumarate, dimethyl orthophthalate, dimethylsuccinate, dimethyl glutarate, dimethyl adipate; esters and anhydrides of all the aforementioned acids; and mixtures thereof.

The first and second polyester material may each, independently, be formed from a diol. The first and second polyester material may each, independently, be formed from any suitable diol. Suitable examples of diols include, but are not limited to the following: ethylene glycol; 1,2-propane diol; 1,3-propane diol; 1,2-butandiol; 1,3-butandiol; 1,4-butandiol; but-2-ene 1,4-diol; 2,3-butane diol; 2-methyl 1,3-propane diol; 2,2'-dimethyl 1,3-propanediol (neopentyl glycol); 1,5 pentane diol; 3-methyl 1,5-pentanediol; 2,4-diethyl 1,5-pentane diol; 1,6-hexane diol; 2-ethyl 1,3-hexane diol; diethylene glycol; triethylene glycol; dipropylene glycol; tripropylene glycol; 2,2,4-trimethyl pentane 1,3-diol; 1,4 cyclohexane dimethanol; tricyclodecane dimethanol; 2,2,4, 4-tetramethyl cyclobutane 1,3-diol; isosorbide; 1,4-cyclohexane diol; 1,1'-isopropylidene-bis (4-cyclohexanol); and mixtures thereof.

Examples of suitable additional polyacids which can optionally be used to produce branched polymers include, but are not limited to the following: trimellitic anhydride; trimellitic acid; pyromellitic acid; esters and anhydrides of all the aforementioned acids; and mixtures thereof.

Examples of suitable additional polyols which can optionally be used to produce branched polymers include, but are not limited to the following: glycerine; trimethylol propane; trimethylol ethane; 1,2,6 hexane triol; pentaerythritol; erythritol; di-trimethylol propane; di-pentaerythritol; N,N,N',N' tetra (hydroxyethyl)adipindiamide; N,N,N'N' tetra (hydroxypropyl)adipindiamide; other, primarily hydroxyl, functional branching monomers; or mixtures thereof.

The term "alk" or "alkyl", as used herein unless otherwise defined, relates to saturated hydrocarbon radicals being straight, branched, cyclic or polycyclic moieties or combinations thereof and contain 1 to 20 carbon atoms, suitably 1 to 10 carbon atoms, more suitably 1 to 8 carbon atoms, still more suitably 1 to 6 carbon atoms, yet more suitably 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or heteroatom, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like. The term "alkylene", as used herein, relates to a bivalent radical alkyl group as defined above. For example, an alkyl group such as methyl which would be represented as $-CH_3$, becomes methylene, $-CH_2-$, when represented as an alkylene. Other alkylene groups should be understood accordingly.

The term "alkenyl", as used herein, relates to hydrocarbon radicals having a double bond, suitably up to 4, double bonds, being straight, branched, cyclic or polycyclic moieties or combinations thereof and containing from 2 to 18 carbon atoms, suitably 2 to 10 carbon atoms, more suitably from 2 to 8 carbon atoms, still more suitably 2 to 6 carbon atoms, yet more suitably 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or alkyl, and/or be interrupted by oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like. The term "alkenylene", as used herein, relates to a bivalent radical alkenyl group as defined above. For example, an alkenyl group such as ethenyl which would be represented as $-CH=CH_2$, becomes ethenylene, $-CH=CH-$, when represented as an alkenylene. Other alkenylene groups should be understood accordingly.

The term "alkynyl", as used herein, relates to hydrocarbon radicals having a triple bond, suitably up to 4, triple bonds, being straight, branched, cyclic or polycyclic moieties or combinations thereof and having from 2 to 18 carbon atoms, suitably 2 to 10 carbon atoms, more suitably from 2 to 8 carbon atoms, still more suitably from 2 to 6 carbon atoms, yet more suitably 2 to 4 carbon atoms. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by oxygen or sulphur atoms, or by silano or dialkylsiloxane groups. Examples of such radicals may be independently selected from alkynyl radicals include ethynyl, propynyl, propargyl, butynyl, pentynyl, hexynyl and the like. The term "alkynylene", as used herein, relates to a bivalent radical alkynyl group as defined above. For example, an alkynyl group such as ethynyl which would be represented as $-C\equiv CH$, becomes ethynylene, $-C\equiv C-$, when represented as an alkynylene. Other alkynylene groups should be understood accordingly.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by oxygen or sulphur atoms, or by silano or dialkylsilcon groups. Examples of such radicals may be independently selected from phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like. The term "arylene", as used herein, relates to a bivalent radical aryl group as defined above. For example, an aryl group such as phenyl which would be represented as -Ph, becomes phenylene, -Ph-, when represented as an arylene. Other arylene groups should be understood accordingly.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

The first and second polyester material may each, independently, be formed from any suitable molar ratio of polyacid:polyol. The molar ratio of polyacid:polyol in the polyester material may be from 10:1 to 1:10, suitably from 5:1 to 1:5, such as from 3:1 to 1:3, or even from 2:1 to 1:2. Suitably, the molar ratio of polyacid:polyol in the polyester material may be from 1.5:1 to 1:1.5, such as 1.2:1 to 1:1.2.

The first and second polyester material may each, independently, be formed from any suitable molar ratio of diacid:diol. The molar ratio of diacid:diol in the polyester material may be from 2:1 to 1:2. Suitably, the molar ratio of diacid:diol in the polyester material may be from 1.5:1 to 1:1.5, such as 1.2:1 to 1:1.2 or even from 1.1:1 to 1:1.1.

The first and second polyester material may each, independently, optionally be formed from any suitable molar ratio of diacid+diol to polyacid and/or polyol. The polyester material may comprise a molar ratio of diacid+diol to polyacid and/or polyol of from 100:1 to 1:1, suitably from 100:1 to 5:1, such as from 100:1 to 20:1, or even from 100:1 to 50:1.

The first and second polyester material may each, independently, optionally be formed from additional monomers. Suitably, the polyester material may optionally include an additional monomer selected from monoacids or monohydric alcohols or combinations thereof. Suitably, the optional additional monomer may be organic.

The first and second polyester material may each, independently, optionally be formed from additional monoacids. "Monoacid", and like terms as used herein, refers to compounds having one carboxylic acid group and includes an ester of the monoacid (where the acid group is esterified) or an anhydride. The monoacid is suitably an organic monoacid.

The first and second polyester material may each, independently, optionally be formed from any suitable additional monoacid. Suitable examples include, but are not limited to the following: benzoic acid; cyclohexane carboxylic acid; tricyclodecane carboxylic acid; camporic acid; benzoic acid; t-butyl benzoic acid; $C_1$-$C_{18}$ aliphatic carboxylic acids such as acetic acid; propanoic acid; butanoic acid; hexanoic acid; oleic acid; linoleic acid; undecanoic acid; lauric acid; isononanoic acid; fatty acids; hydrogenated fatty acids of naturally occurring oils; esters and/or anhydrides of any of the aforementioned acids and combinations thereof.

The first and second polyester material may each, independently, optionally be formed from additional monohydric alcohols. "Monohydric alcohol" and like terms as used herein, refers to compounds having one hydroxyl group. Suitably, the monohydric alcohol is an organic monohydric alcohol.

The first and second polyester material may each, independently, optionally be formed from any suitable additional monohydric alcohol. Suitable examples include but are not limited to the following: benzyl alcohol; hydroxyethoxybenzene; methanol; ethanol; propanol; butanol; pentanol; hexanol; heptanol; dodecyl alcohol; stearyl alcohol; oleyl alcohol; undecanol; cyclohexanol; phenol; phenyl carbinol; methylphenyl carbinol; cresol; monoethers of glycols; halogen-substituted or other substituted alcohols and combinations thereof.

The first and second polyester material may each, independently, comprise commercially available polyester materials. Suitable commercially available polyester materials include, but are not limited to the following: those sold under the trade names DOMOPOL (commercially available from Helois), such as DOMOPOL 6046, DOMOPOL 5119, DOMOPOL 5120, DOMOPOL 9010, DOMOPOL 9020, DOMOPOL 9040, DOMOPOL 5155, DOMOPOL 9050; those sold under the trade name DYNAPOL (commercially available from Evonik), such as DYNAPOL LH318-02, DYNAPOL LS415, DYNAPOL LH822-01, DYNAPOL LH833-03, DYNAPOL L205, DYNAPOL L912, DYNAPOL L952; those sold under the trade name URALAC (commercially available from DSM), such as URALAC SN805, URALAC SH973, URALAC SH970, URALAC SH865, URALAC SN865, URALAC SN859, URALAC SH979, those sold under the trade name VYLON (commercially available from Toyobo), such as VYLON 270, VYLON 650, VYLON GK330, VYLON GK640, those sold under the trade name SKYBON (commercially available from SK Chemicals), such as SKYBON ES350, SKYBON ES660, SKYBON ES680, SKYBON ES770, SKYBON ES215.

The first and second polyester material may each, independently, have any suitable number-average molecular weight (Mn). The first and second polyester material may each, independently, have an Mn from 500 Daltons (Da=g/mole) to 30,000 Da, suitably from 1,000 Da to 25,000 Da, such as from 12,000 Da to 20,000 Da, or even from 3,000 to 18,000 Da.

The first and second polyester material may each, independently, have an Mn of 500 Da or greater, such as 1,000 Da or 2,000 Da or greater, or 3,000 or greater, such as 4,000 Da or greater, or 5,000 Da or greater. The first and second polyester material may each, independently, have an Mn of 6,000 Da or greater, such as 7,000 Da or greater or 8,000 Da or greater.

The first and second polyester material may each, independently, have an Mn of 30,000 Da or lower, such as 28,000 Da or lower, or 26,000 Da or lower, or 24,000 Da or lower. The first and second polyester material may each, independently, have an Mn of 22,000 Da or lower, such as 20,000 Da or lower, or 18,000 Da or lower.

The number-average molecular weight may be measured by any suitable method. Techniques to measure the number-average molecular weight will be well known to a person skilled in the art. Suitably, and as reported herein, the Mn may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector; 254 nm, solvent: unstabilized THF, retention time marker: toluene, sample concentration: 2 mg/ml).

The first polyester material has a glass transition temperature (Tg) of from 55° C. to 105° C., suitably from 55° C. to 100° C. The first polyester material may have a Tg of from 60° C. to 95° C., suitably from 60° C. to 85° C., such as 55° C. to 80° C., or 60° C. to 70° C.

The first polyester material has a glass transition temperature (Tg) of at least 55° C. The first polyester material may have a Tg of greater than 58° C., such as greater than 60° C. or greater than 63° C., such as greater than 65° C.

The first polyester material has a glass transition temperature (Tg) of 105° C. or lower. The first polyester material may have a Tg of 100° C. or lower, such as 95° C. or lower, or 90° C. or lower, such as 85° C. or lower. The first polyester material may have a Tg of 80° C. or lower, such as 75° C. or lower, or 70° C. or lower.

The second polyester material has a glass transition temperature (Tg) of from −10° C. to 25° C. The second polyester material may have a Tg from −5° C. to 20° C., suitably from 0° C. to 15° C., such as 0° C. to 10° C.

The second polyester material has a glass transition temperature (Tg) of at least −10° C. The second polyester material may have a Tg of greater than −8° C., such as greater than −5° C. or greater than −2° C., such as greater than 0° C.

The second polyester material has a glass transition temperature (Tg) of 25° C. or lower. The second polyester material may have a Tg of 22° C. or lower, such as 20° C. or lower, or 18° C. or lower, such as 15° C. or lower. The second polyester material may have a Tg of 12° C. or lower, such as 10° C. or lower.

The glass transition temperature of the first and second polyester material may be measured by any suitable method. Methods to measure Tg will be well known to a person skilled in the art. Suitably, and as reported herein, the Tg is measured according to ASTM D6604-00 (2013) ("Standard Practice for Glass Transition Temperatures of Hydrocarbon Resins by Differential Scanning calorimetry". Heat-flux differential scanning calorimetry (DSC), sample pans: aluminium, reference: blank, calibration: indium and mercury, sample weight: 10 mg, heating rate: 20° C./min).

The first and second polyester material may each, independently, have any suitable gross hydroxyl value (OHV). The first and second polyester material may each, independently, have a gross OHV from 0 to 200 mg KOH/g. Suitably, the first and second polyester material may each, independently, have a gross OHV from 50 to 190 mg KOH/g, such as from 75 to 175 mg KOH/g, or even from 100 to 160 mg KOH/g.

The gross OHV, as reported herein, is expressed on solids.

The first and second polyester material may each, independently, have any suitable acid value (AV). The first and second polyester material may each, independently, have an AV from 0 to 120 KOH/g. Suitably, the first and second polyester material may each, independently, have a gross AV from 1 tp 100 mg KOH/g, such as from 1 to 20 mg KOH/g, or even from 1 to 10 mg KOH/g.

The AV as reported herein is expressed on solids.

The first and second polyester material may each, independently, be prepared in the presence of an esterification catalyst. Suitably, the esterification catalyst may be chosen to promote the reaction of components by esterification and/or trans-esterification. Suitable examples of esterification catalysts for use in the preparation of the polyester material include, but are not limited to the following: metal compounds such as stannous octoate; stannous chloride; butyl stannoic acid (hydroxy butyl tin oxide); monobutyl tin tris (2-ethylhexanoate); chloro butyl tin dihydroxide; dibutyltin oxide; tetra-n-propyl titanate; tetra-n-butyl titanate; zinc acetate; acid compounds such as phosphoric acid; para-toluene sulphonic acid; dodecyl benzene sulphonic acid (DDBSA) and combinations thereof. The esterification catalyst may be dodecyl benzene sulphonic acid (DDBSA).

The esterification catalyst, when present, may be used in amounts from 0.001 to 1% by weight on total polyester components, suitably from 0.01 to 0.2%, such as from 0.025 to 0.2% by weight on total polyester components.

The first polyester material may comprise the reaction product of;
(i) 1,2-propanediol,
(ii) terephthalic acid, and
(iii) a molecular weight increasing agent,
wherein the first polyester material has a number-average molecular weight (Mn) of at least 6,100 Da and a glass transition temperature (Tg) of at least 80° C.

By "molecular weight increasing agent" is meant a substance that increases the number-average molecular weight (Mn) of the first polyester material.

The molecular weight increasing agent may be any suitable compound capable of increasing the Mn of the first polyester material. Suitably, the molecular weight increasing agent may comprise a polyacid, a polyol or combinations thereof.

The molecular weight increasing agent may comprise a polyacid. Suitably, the molecular weight increasing agent may comprise a diacid.

The molecular weight increasing agent comprises a diacid of general formula (I)

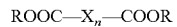

$$ROOC-X_n-COOR \qquad \text{formula (I)}$$

wherein each R independently represents hydrogen or an alkyl, alkenyl, alkynyl, or aryl group; n=0 or 1; and wherein X represents a bridging group selected from: an alkylene group; an alkenylene group; an alkynylene group; an arylene group; wherein the bridge between the —COOR groups is $C_1$ or $C_2$.

Suitable examples of polyacid molecular weight increasing agents include, but are not limited to the following: oxalic acid; malonic acid; succinic acid; orthophthalic acid; maleic acid; fumaric acid; itaconic acid; methylmalonic acid; ethylmalonic acid; propylmalonic acid; 2-methylsuccinic acid; 2-ethylsuccinic acid; 2-propylsuccinic acid; trans-cyclopentane-1,2-dicaboxylic acid; cis-cyclopentane-1,2-dicaboxylic acid; trans-cyclohexane-1,2-dicaboxylic acid; cis-cyclohexane-1,2-dicaboxylic acid; acids and anhydrides of all the aforementioned acids and combinations thereof. The polyacid molecular weight increasing agents may comprise maleic anhydride, itaconic acid or a combination thereof.

Suitably, the polyacid molecular weight increasing agent may comprise maleic anhydride.

The molecular weight increasing agent may comprise a polyol. Suitably, the molecular weight increasing agent may comprise a triol.

The hydroxyl groups of the polyol molecular weight increasing agents may be connected by a $C_1$ to $C_3$ alkylene group. The $C_1$ to $C_3$ alkylene group may be substituted or unsubstituted. The $C_1$ to $C_3$ alkylene group may be optionally substituted with the following: halo; hydroxyl; nitro; mercapto; amino; alkyl; alkoxy; aryl; sulfo and sulfoxy groups. The $C_1$ to $C_3$ alkylene group may be linear or branched. The $C_1$ to $C_3$ alkylene group may be saturated or unsaturated.

Suitably, there may be no more than 3 carbon atoms connecting between the hydroxyl groups.

Suitable examples of polyol molecular weight increasing agents include, but are not limited to the following: methylene glycol; ethylene glycol; propylene glycol; neopentyl glycol; 1,2-propanediol; butyl ethyl propanediol; 2-methyl-1,3-propanediol; 2-ethyl-2-butyl-1,3-propanediol; trimethylolmethane; trimethylolethane; trimethylolpropane; glycerol; pentaerythritol; and combinations thereof. Suitably, the polyol molecular weight increasing agent comprises trimethylolpropane.

The terephthalic acid (ii) may be in any suitable form. It will be well known to a person skilled in the art that terephthalic acid is often provided in a form which also contains isophthalic acid as a contaminant. However, the terephthalic acid may be provided in a form which is substantially free of isophthalic acid. By "substantially free" we mean to refer to terephthalic acid which contains less than 5 wt % isophthalic acid, preferably less than 2 wt % isophthalic acid, more preferably less than 0.05 wt % isophthalic acid. The terephthalic acid may contain 0 wt % isophthalic acid.

The first polyester material may comprise any suitable molar ratio of (i)+(ii):(iii). The molar ratio of (i)+(ii):(iii) may range from 100:1 to 1:1, such as from 80:1 to 5:1. As a non-limiting example, when the molecular weight increasing agent is a polyacid the molar ratio of (i)+(ii):(iii) may be 25:1. As a further non-limiting example, when the molecular weight increasing agent is a polyol the molar ratio of (i)+(ii):(iii) may be 80:1

The first or second polyester material may each, independently have a low degree of branching. The first and second polyester material may be substantially linear or be slightly branched. For example, the degree of branching of the first and second polyester material may be measured by the polydispersity index of the said high molecular weight polyester material. The polydispersity index of a polymer is given by the ratio of Mw to Mn (Mw/Mn), wherein Mw is the weight-average molecular weight and Mn is the number average molecular weight. Suitably, the polydispersity index of the polyester material is from 1 to 20, suitably from 1 to 10.

The first and second polyester material may each, independently, have a molecular weight above the entanglement molecular weight of said polyester material.

"Entanglement molecular weight" and like terms, as used herein, refers to the molecular weight at which the polyester material becomes large enough to entangle. For the avoidance of doubt the molecular weight may be the number-average molecular weight or the weight-average molecular weight. Entanglement molecular weight is typically defined as the molecular weight at which the physical properties, especially the viscosity of the polyester material, change.

Typically, the entanglement molecular weight is determined by plotting the log of the melt viscosity against the log of the molecular weight of a polymer. Typically, as the molecular weight increases, the plot follows a gently upward sloping linear path. However, once the entanglement molecular weight is reached, the gently sloping linear path increases to a rapidly sloping linear path. Hence the entanglement molecular weight may be determined as the point on the plot where the slope changes from gently sloping to rapidly sloping.

Techniques to measure the melt viscosity will be well known to a person skilled in the art. Suitably, the melt viscosity may be measured at a high shear rate such as that applied by a cone and plate rheometer, typical methods are as described in standard methods such as ASTM D4287.

The components (i), (ii) and (iii) of the polyester material may be contacted in any order.

The first polyester material may be prepared in a one step process. Suitably, in a one step process, the components (i), (ii) and (iii) are all reacted together at the same time. Suitably, the first polyester material may be prepared in a one step process where the molecular weight increasing agent comprises a polyol.

Suitably, in a one step process, components (i), (ii) and (iii) may be contacted together at a first reaction temperature, T1, wherein T1 may be a temperature of between 90° C. and 260° C., suitably from 200° C. to 250° C., such as from 200° C. to 230° C.

Typically, in a one step process, the reaction is allowed to proceed for a total period of 1 minute to 100 hours, such as from 2 hours to 80 hours. It will be appreciated by a person skilled in the art that the reaction conditions may be varied depending on the reactants used.

The first polyester material is present in the polyester blend in an amount of 60 to 90 wt % (based on solids). Suitably, the first polyester is present in the polyester blend in an amount of 65 to 85 wt % (based on solids), such as 75 to 80 wt % (based on solids).

The first polyester material is present in the polyester blend in an amount of 60 wt % or greater (based on solids), such as 62 wt % or greater or 65 wt % or greater, such as 68 wt % or greater or 70 wt % or greater, such as 72 wt % or greater or 75 wt % or greater.

The first polyester material is present in the polyester blend in an amount of 90 wt % or less (based on solids), such as 88 wt % or less or 85 wt % or less, such as 83 wt % or less or 80 wt % or less.

The second polyester material present in the polyester blend in an amount of 10 to 40 wt % (based on solids). Suitably the second polyester is present in the polyester blend in an amount of 15 to 35 wt % (based on solids), such as 20 to 25 wt %.

The second polyester material is present in the polyester blend in an amount of 10 wt % or greater (based on solids), such as 12 wt % or greater or 15 wt % or greater, such as 18 wt % or greater or 20 wt % or greater.

The second polyester material is present in the polyester blend in an amount of 40 wt % or less (based on solids), such as 38 wt % or less or 35 wt % or less, such as 33 wt % or less or 30 wt % or less, such as 28 wt % or less or 25 wt % or less.

The polyester blend may further comprise further polyester materials. The further polyester materials may comprise any suitable polyester material. The further polyester material may comprise polyester materials as defined for either of the first and second polyester material, above, but with any suitable Tg. The further polyester materials may be present in the polyester blend in an amount of up to 30 wt % (based on solids), such as up to 25 wt % (based on solids), or up to 20 wt % (based on solids), or up to 15 wt % (based on solids), or up to 10 wt % (based on solids), or up to 5 wt % (based on solids), or up to 1 wt % (based on solids).

The polyester blend may further comprise less than 5 wt % (based on solids) of further polyester materials, such as less than 1 wt % (based on solids), or less than 0.5 wt % (based on solids). Suitably, the polyester blend consists of the first polyester material and the second polyester material.

Suitably, the polyester blend is present in the coating composition in an amount of 25 to 70 wt %, such as 35 to 65 wt %, or 40 to 60 wt %. The polyester blend may be present in the coating composition in an amount of 55 to 65 wt %.

The polyester blend may be present in the coating composition in an amount of at least 25 wt %, such as at least 30 wt %, or at least 35 wt %, such as at least 40 wt %, or at least 45 wt %, such as at least 50 wt %, or at least 55 wt %.

The polyester blend may be present in the coating composition in an amount of 70 wt % or lower, such as 65 wt % or lower, or 60 wt % or lower.

The coating composition further comprises a crosslinking system comprising an amine crosslinking material; a phenolic crosslinking material; and an isocyanate crosslinking material.

The amine crosslinking material may comprise any material having a plurality of amine functional units.

Suitably, the amine crosslinking material may comprise an aminoplast resin. Suitably, the amine crosslinking material may comprise those which are formed by reacting a triazine, such as melamine or benzoguanamine, with formaldehyde.

Suitable examples of aminoplast resins include those which are formed by reacting a triazine such as melamine or benzoguanamine with formaldehyde. Suitably, these condensates may be etherified, typically, with methanol, ethanol, butanol or mixtures thereof. For the chemistry, preparation and use of aminoplast resins, see "The Chemistry and Applications of Amino Crosslinking agents or Aminoplast", Vol. V, Part 11, page 21 ff., edited by Dr. Oldring; John Wiley & Sons/Cita Technology Limited, London, 1998. Suitable examples of commercially available aminoplast resins include, but are not limited to, those sold under the trade name MAPRENAL (registered trade mark), such as MAPRENAL MF980 (commercially available from Ineos); those sold under the trade name CYMEL (registered trade mark), such as CYMEL 303 and CYMEL 1128 (available from Allnex Industries); and combinations thereof.

Suitably, the amine crosslinking material comprises benzoguanamine, melamine or a derivative thereof. Suitable examples of commercially available benzoguanamine, melamine and its derivatives include, but are not limited to benzoguanamine-formaldehyde based materials such as those sold under the trade name CYMEL (registered trade mark), for example CYMEL 1123 (commercially available from Allnex Industries), those sold under the trade name ITAMIN (registered trade mark), for example ITAMIN BG143 (commercially available from Galstaff Multiresine) or those sold under the trade name MAPRENAL (registered trade mark), for example, MAPRENAL BF891, MAPRENAL BF891/60B, MAPRENAL BF892 and MAPRENAL BF 892/68B (commercially available from Ineos); glycoluril based materials, such as those sold under the trade name CYMEL (registered trade mark), for example, CYMEL 1170 and CYMEL 1172, CYMEL 5010B (commercially available from Allnex); and combinations thereof.

Suitably, the benzoguanamine, melamine or derivative thereof may comprise benzoguanamine-formaldehyde based materials sold under the trade name MAPRENAL (registered trade mark).

Suitably, the benzoguanamine or derivative thereof may comprise MAPRENAL BF892, MAPRENAL MF 986/80B and/or MAPRENAL BF 892/68B (commercially available from Ineos). Suitably, benzoguanamine, melamine or derivative thereof may comprise MAPRENAL BF 891/60B (commercially available from Ineos).

The phenolic crosslinking material may comprise a phenolic resin.

Suitable examples of phenolic resins are those formed from the reaction of a phenol with an aldehyde or a ketone, suitably from the reaction of a phenol with an aldehyde, such as from the reaction of a phenol with formaldehyde or acetaldehyde, or even from the reaction of a phenol with formaldehyde. Non-limiting examples of phenols which may be used to form phenolic resins are phenol, butyl phenol, xylenol and cresol. General preparation of phenolic resins is described in "The Chemistry and Application of Phenolic Resins or Phenoplasts", Vol V, Part I, edited by Dr Oldring; John Wiley and Sons/Cita Technology Limited, London, 1997. Suitably, the phenolic resins are of the resol type. By "resol type" we mean resins formed in the presence of a basic (alkaline) catalyst and optionally an excess of formaldehyde. Suitable examples of commercially available phenolic resins include, but are not limited to those sold under the trade name PHENODUR® commercially available from Allnex Industries, such as PHENODUR EK-827, PHENODUR VPR1785, PHENODUR PR 515, PHENODUR PR516, PHENODUR PR 517, PHENODUR PR 285, PHENODUR PR612 or PHENODUR PH2024; resins sold under the trade name BAKELITE® commercially available from Hexion, such as BAKELITE 6582 LB, BAKELITE 6535, BAKELITE PF9989 or BAKELITE PF6581; SFC 112 commercially available from Schenectady; DUREZ® 33356 commercially available from SHHPP; ARALINK® 40-852 commercially available from Bitrez; or combinations thereof.

Suitably, the phenolic crosslinking material comprises PHENODUR 516/60B, commercially available from Allnex Industries.

The isocyanate crosslinking material may comprise an isocyanate resin.

Suitable examples of isocyanate resins include, but are not limited to the following: isophorone diisocyanate (IPDI), such as those sold under the trade name DESMODUR® commercially available from Covestro, for example DESMODUR VP-LS 2078/2 or DESMODUR PL 340 or those sold under the trade name VESTANAT® commercially available from Evonik, for example VESTANAT B 1370, VESTANAT B 118 6A or VESTANAT B 1358 A; blocked aliphatic polyisocyanate based on hexamethylene diisocyanate (HDI), such as those sold under the trade name DESMODUR® commercially available from Covestro, for example DESMODUR BL3370 or DESMODUR BL 3175 SN, those sold under the trade name DURANATE® commercially available from Asahi KASEI, for example DURANATE MF-K60X, those sold under the trade name TOLONATE® commercially available from Perstorp, for example TOLONATE D2 or those sold under the trade name TRIXENE® commercially available from Baxenden, for example TRIXENE-BI-7984 or TRIXENE 7981; or combinations thereof.

The isocyanate crosslinking material may comprise a blocked isocyanate material. The isocyanate material may comprise a caprolactam blocked isocyanate material. The isocyanate crosslinking material may comprise DESMODUR BL2078/2, commercially available from Covestro.

Suitably, the crosslinking system comprises the components a):b):c) in a ratio (based on weight of solids) of 0.5-1.5:0.5-1.5:0.5-1.5. For example, the crosslinking system may comprise the components a):b):c) in a ratio (based on weight of solids) of 0.8-1.2:0.8-1.2:0.8-1.2. The crosslinking system may comprise the components a):b):c) in a ratio (based on weight of solids) of 0.9-1.1:0.9-1.1:0.9-1.1.

Suitably, component a) is present in the crosslinking system in an amount of 5 to 40 wt % (based on solids). Suitably, component a) is present in the crosslinking system in an amount of between 10 to 40 wt % (based on solids). Suitably, component a) is present in the crosslinking system in an amount of between 15 to 35 wt % (based on solids).

Suitably, component b) is present in the crosslinking system in an amount of 5 to 40 wt % (based on solids). Suitably, component b) is present in the crosslinking system in an amount of between 10 to 40 wt % (based on solids). Suitably, component b) is present in the crosslinking system in an amount of between 15 to 35 wt % (based on solids).

Suitably, component c) is present in the crosslinking system in an amount of 5 to 40 wt % (based on solids). Suitably, component c) is present in the crosslinking system in an amount of between 10 to 40 wt % (based on solids). Suitably, component c) is present in the crosslinking system in an amount of between 15 to 35 wt % (based on solids).

Suitably, the crosslinking system consists of components a), b) and c).

Suitably, the crosslinking system is present in the coating composition in an amount of (by weight of solids) of 30 to 70 wt %, such as 35 to 65 wt %, such as 40 to 60 wt %. Suitably, the crosslinking system is present in the coating composition in an amount of (by weight of solids) of 40 to 55 wt %, such as 45 to 50 wt %.

The coating composition may further comprise a solvent. The coating composition may comprise a single solvent or a mixture of solvents. The solvent may comprise water, an organic solvent, a mixture of water and an organic solvent or a mixture of organic solvents.

The organic solvent suitably has sufficient volatility to essentially entirely evaporate from the coating composition during the curing process. As a non-limiting example, the curing process may be by heating at 120-280° C. for 9 second to 15 minutes.

Suitable organic solvents include, but are not limited to the following: aliphatic hydrocarbons such as mineral spirits and high flash point naphtha; aromatic hydrocarbons such as benzene; toluene; xylene; solvent naphtha 100, 150, 200; those available from Exxon-Mobil Chemical Company under the SOLVESSO® trade name; alcohols such as ethanol; n-propanol; isopropanol; and n-butanol; ketones such as acetone; cyclohexanone; methylisobutyl ketone; methyl ethyl ketone; esters such as ethyl acetate; butyl acetate; n-hexyl acetate; RHODIASOLV® RPDE (a blend of succinic and adipic esters commercially available from Solvay); glycols such as butyl glycol; glycol ethers such as methoxypropanol; ethylene glycol monomethyl ether; ethylene glycol monobutyl ether and combinations thereof. The solvent, when present, may suitably be used in the coating composition in amounts from 5 to 90 wt %, suitably from 10 to 80 wt %, such as from 20 to 75 wt %, or even from 30 to 70 wt % based on the total weight of the coating composition. Suitably, the solvent, when present, may be used in the coating composition in amounts from 50 to 70 wt % based on the total weight of the coating composition.

The first and second polyester material may each, independently, or together be dissolved or dispersed in the said solvent during and/or after their formation.

The coating composition may further comprise a catalyst. Any catalyst typically used to catalyse crosslinking reactions between polyester materials and crosslinking agents may be used. Suitable catalysts will be well known to the person skilled in the art. The catalyst may be a non-metal or a metal catalyst or a combination thereof. Suitable non-metal catalysts include, but are not limited to the following: phosphoric acid; blocked phosphoric acid; CYCAT® XK 406 N (commercially available from Allnex); sulfuric acid; sulfonic acid; CYCAT 600 (commercially available from Allnex); NACURE® 5076 or NACURE 5925 (commercially available from King industries); acid phosphate catalyst such as NACURE XC 235 (commercially available from King Industries); and combinations thereof. Suitable metal catalysts will be well known to the person skilled in the art. Suitable metal catalysts include, but are not limited to the following: tin containing catalysts, such as monobutyl tin tris (2-ethylhexanoate); zirconium containing catalysts, such as KKAT® 4205 (commercially available from King Industries); titanate based catalysts, such as tetrabutyl titanate TnBT (commercially available from Sigma Aldrich); and combinations thereof. The catalyst, when present, may be used in the coating composition in any suitable amount. The catalyst, when present, may be used in amounts from 0.001 to 10 wt %, suitably from 0.001 to 5 wt %, such as from 0.01 to 5 wt %, or even from 1 to 3 wt % based on the total solid weight of the coating composition. Suitably, the catalyst, when present, may be used in amounts from 0.01 to 1.5 wt % based on the total solid weight of the coating composition.

The coating compositions may comprise other optional materials well known in the art of formulating coatings, such as colorants, plasticizers, abrasion-resistant particles, antioxidants, hindered amine light stabilizers, UV light absorbers and stabilizers, surfactants, flow control agents, thixotropic agents, fillers, organic co-solvents, reactive diluents, catalysts, grind vehicles, lubricants, waxes and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention. Particularly suitable for packaging coatings are those approved for food contact, such as titanium dioxide; iron oxides, such as black iron oxide; carbon black; ultramarine blue; phthalocyanines, such as phthalocyanine blue and phthalocyanine green; chromium oxides, such as chromium green oxide (not ok for food contact-exclude chromium oxides); graphite fibrils; ferried yellow; quindo red; and combinations thereof, and those listed in Article 178.3297 of the Code of Federal Regulations, which is incorporated by reference herein. The colorant, when present, may be used in the coating composition in any suitable amount. The colorant, when present, may be used in the coating composition in amounts up to 50 wt %, such as up to 250 wt %, or even up to 10 wt % based on the total solid weight of the coating composition. The colourant may be present in the coating composition in amount of at least 0.1 wt % based on the total solid weight of the coating composition, such as at least 0.5 wt % or at least 1 wt %, or at least 5 wt %.

Suitable lubricants will be well known to the person skilled in the art. Suitable examples of lubricants include, but are not limited to the following: carnauba wax and polyethylene type lubricants. The lubricant, when present, may be used in the coating composition in amounts of at least 0.01 wt % based on the total solid weight of the coating composition.

Surfactants may optionally be added to the coating composition in order to aid in flow and wetting of the substrate. Suitable surfactants will be well known to the person skilled in the art. Suitably the surfactant, when present, is chosen to be compatible with food and/or beverage container applications. Suitable surfactants include, but are not limited to the following: alkyl sulphates (e.g., sodium lauryl sulphate); ether sulphates; phosphate esters; sulphonates; and their various alkali, ammonium, amine salts; aliphatic alcohol ethoxylates; alkyl phenol ethoxylates (e.g. nonyl phenol polyether); salts and/or combinations thereof. The surfactants, when present, may be present in amounts from 0.01 wt % to 10 wt %, suitably from 0.01 to 5 wt %, such as from 0.01 to 2 wt % based on the total solid weight of the coating composition.

The coating compositions used according to the present invention, may be substantially free, may be essentially free and/or may be completely free of bisphenol A and epoxy compounds derived from bisphenol A ("BPA"), such as bisphenol A diglycidyl ether ("BADGE"). Such compounds are sometimes referred to as "BPA non intent" because BPA, including derivatives or residues thereof, are not intentionally added but may be present in trace amounts because of impurities or unavoidable contamination from the environment. The coating compositions can also be substantially free and may be essentially free and/or may be completely free of bisphenol F and epoxy compounds derived from bisphenol F, such as bisphenol F diglycidyl ether ("BFDGE"). The term "substantially free" as used in this context means the coating compositions contain less than 1000 parts per million (ppm), "essentially free" means less than 100 ppm and "completely free" means less than 20 parts per billion (ppb) of any of the above mentioned compounds, derivatives or residues thereof. The coating compositions used according to the present invention may be substantially, essentially and/or completely free of metallic, such as metallic silver, metallic copper and the like.

The coating compositions may be substantially free, may be essentially free or may be completely free of dialkyltin compounds, including oxides or other derivatives thereof. Examples of dialkyltin compounds include, but are not limited to the following: dibutyltindilaurate (DBTDL); dioctyltindilaurate; dimethyltin oxide; diethyltin oxide; dipropyltin oxide; dibutyltin oxide (DBTO); dioctyltinoxide (DOTO) or combinations thereof. By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to coating compositions containing less than 20 parts per billion (ppb) of any of the compounds or derivatives thereof.

The coating compositions may be substantially free, may be essentially free or may be completely free of styrene. By "substantially free" we mean to refer to coating compositions containing less than 1000 parts per million (ppm) of any of the compounds or derivatives thereof mentioned above. By "essentially free" we mean to refer to coating compositions containing less than 100 ppm of any of the compounds or derivatives thereof mentioned above. By "completely free" we mean to refer to coating compositions containing less than 20 parts per billion (ppb) of any of the compounds or derivatives thereof.

The coating composition of the present invention may be cured by any suitable method. The coating composition may be cured by heat curing or by chemical curing, suitably by heat curing. The coating composition, when heat cured, may be cured at any suitable temperature. The coating composition, when heat cured, may be cured at temperatures from 50 to 350° C., suitably from 100 to 320° C., such as from 150 to 300° C., or even from 200 to 300° C. Suitably, the coating composition, when heat cured, may be cured at 230° C. or at 250° C. Suitably, the coating composition, when heat cured, may be cured to a peak metal temperature (PMT) of 170° C. to 280° C. For the avoidance of doubt, the term "peak metal temperature", and like terms as used herein, is meant unless specified otherwise the maximum temperature reached by the metal substrate during exposure to a heat during the heat curing process. In other words, the peak metal temperature (PMT) is the maximum temperature reached by the metal substrate and not the temperature which is applied thereto. It will be appreciated by a person skilled in the art that the temperature reached by the metal substrate may be lower than the temperature which is applied thereto or may be substantially equal to the temperature which is applied thereto. Suitably, the temperature reached by the metal substrate may be lower that the temperature which is applied thereto.

Suitably, the coating compositions described herein may be applied to a metal can. The present invention extends to such metal cans.

The metal can may be formed from any suitable material. Suitably, the metal can may be a food or beverage can. The metal can may be a monobloc aerosol can, which may be formed from aluminum. Suitable metals will be well known to a person skilled in the art. Suitable examples include, but are not limited to the following: steel; tinplate; tinplate pre-treated with a protective material such as chromium, titanium, titanate or aluminium; tin-free steel (TFS); galvanised steel, such as for example electro-galvanised steel; aluminium; aluminium alloy; and combinations thereof. It will be appreciated by a person skilled in the art that the can body and can end of the food or beverage can may be formed from the same or different materials, such as the same or different metals. Suitably, the can body and can end of the beverage can may be formed from the same material, such as the same metal.

The can body and/or can end may be made from coiled metal stock. Suitably, at least the can end may be formed from coiled metal stock. Suitably, the coating compositions of the present invention may be applied to coiled metal stock, such as the coiled metal stock from which the ends of cans are made ("can end stock").

The coating composition may be applied to any part or the entirety of the food or beverage can. Suitably, the coating composition is applied to a food or beverage contact surface of the food or beverage can. For example, an internal surface of the food or beverage can.

The coating compositions may be applied to substantially all of or to a portion of the interior surface of the can. Suitably, the coating compositions may be applied to substantially all of the interior surface of the can end. The coating compositions may be applied to at least a portion of the exterior surface of the can end. The coating compositions may be applied to substantially all of or to a portion of the exterior surface of the can end. The coating compositions may be applied to at least a portion of the interior and/or exterior surface of the can body.

The food or beverage can may be a metal can. The term "metal can" includes any type of metal can, container or any type of receptacle or portion thereof that is sealed by the food and/or beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products.

The coating compositions and/or coating systems can be applied to the interior and/or the exterior of the can. The coating compositions and/or coating systems could also be applied as a rim coat to the bottom of the can. The rim coat functions to reduce friction for improved handling during the continued fabrication and/or processing of the can. The coating can also be applied to caps and/or closures; such application can include, for example, a protective varnish that is applied before and/or after formation of the cap/closure and/or a pigmented enamel post applied to the cap, particularly those having a scored seam at the bottom of the cap.

Metal coils, having wide application in many industries, are also substrates that can be coated according to the present invention. Coil coatings also typically comprise a colorant.

The coating compositions and/or coating systems according to the present invention may be applied to at least a portion of the metal substrate. For example, when the coating compositions and/or coating systems are applied to a food and/or beverage can, the coating compositions may be applied to at least a portion of an internal and/or external surface of said food and/or beverage can.

The coating compositions of the present invention may be applied to the body of a can and to an easy open end (EOE) of a can. For example, the coating compositions and/or the coating systems of the present invention may equally be applied to the body of a can and to a non-easy open end (NEOE) of a can.

Suitably, the coating systems of the present invention may be applied to a food and/or beverage cans with a seam line or weld along the body of the can.

The coating compositions may be applied to the food or beverage can by any suitable method. Methods of applying said coating compositions will be well known to a person skilled in the art. Suitable application methods include, but are not limited to one or more of the following, spray coating, roll coating, dipping and/or electrocoating. It will be appreciated by a person skilled in the art that for two-piece beverage cans, the coating compositions may typically be applied by spray coating after the can is made. It will also be appreciated by the person skilled in the art that for three-piece cans, a flat sheet may typically be roll coated with one or more of the coating compositions first and then the can may be formed. However, the application of the coating compositions is not limited to these methods. It will be appreciated by a person skilled in the art that the can body and can end of the beverage can may be coated with the coating composition by the same or a different method.

The coating compositions may be applied to any suitable dry film thickness. In certain embodiments the coating compositions may be applied to a dry film thickness from about 0.1 µm (microns) to 12 µm, suitably from about 2 µm to 10 µm, more suitably from about 4 µm to 9 µm, or even from about 4 µm to 8 µm.

The coating compositions may be applied to the food or beverage can as a single layer or as part of a multi layer system. The coating composition may be applied as a single layer. The coating composition may be applied as the first coat of a multi coat system. The coating composition may be applied as an undercoat or a primer. The second, third, fourth etc. coats may comprise any suitable paint such as those containing, for example, epoxy resins; polyester resins; polyurethane resins; polysiloxane resins; hydrocarbon resins or combinations thereof. The coating compositions may be applied on top of another paint layer as part of a multi layer system. For example, the coating composition may be applied on top of a primer. The coating compositions may form an intermediate layer or a top coat layer. The coating composition may be applied to a substrate once or multiple times. It will be appreciated by a person skilled in the art that the can body and can end of the beverage can may each independently be coated with a single layer or a multi layer system.

The metal cans of the present invention are coated at least in part with the coating composition. Such compositions can be used alone, or in combination with one or more other compositions, such as a coating system having two or more layers. For example, the coating composition can comprise a colorant or not and can be used as a primer, basecoat, and/or top coat. For substrates coated with multiple coatings, one or more of those coatings can be derived from coating compositions as described herein. The coating composition can be used as a packaging "size" coating, wash coat, spray coat, end coat, and the like. The metal cans of the present invention can be coated on the inside and/or outside at least in part with a coating derived from a coating composition of as described herein.

The application of various pretreatments and coatings to metal cans is well established. Such treatments and/or coatings include those wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food, beverage or cosmetic, for example, can lead to corrosion of a metal container, which can then contaminate the food, beverage or cosmetic. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content and/or high acid content. Coatings can also be applied to the exterior of metal cans. The coatings used according to the present invention can be applied to coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

The metal cans according to the present invention include cans used to contain any food, beverage, cosmetic or other item, particularly for shipping from a point of manufacture to a consumer, and for subsequent storage by a consumer. A metal can will be therefore understood as something that is sealed so as to keep its contents free from deterioration until opened by a consumer, and often after opening, such as in the case of monobloc tubes that dispense cosmetic products such as hair products, sunscreen and the like and other aerosol cans that dispense sunscreen, bug spray, cleaning products and the like. The manufacturer will often identify the length of time during which the food or beverage will be free from spoilage, which typically ranges from several months to years. Thus, the present "metal can" is distinguished from a storage container or metal pan or bakeware in which a consumer might make and/or store food; such a container would only maintain the freshness or integrity of the food item for a relatively short period. The term "metal can" includes any type of metal can, container or any type of receptacle or portion thereof that is sealed by the food/beverage/cosmetic manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. "Beverage can" may also be used to refer more specifically to a food can in which a beverage is packaged. The term "metal can(s)" specifically includes food cans (including beverage cans) and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, cosmetics, such as personal care products, bug spray, spray paint, and any other compound suitable for packaging in an aerosol can. The cans can include "two piece cans" and "three-piece cans" as well as drawn and ironed one-piece cans; such one piece cans often find application with aerosol products.

The coating can be applied to the interior and/or the exterior of the metal can. For example, the coating can be rollcoated or sprayed onto metal used to make a two-piece food can, a three-piece food can, can end stock and/or cap/closure stock. The coating is applied to a coil or sheet such as by roll coating or spray coating; the coating is then cured and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans. The coating can be applied to the inside of the metal can such as by spray coating, and can be used as the only inside coating, with another coating layer on top, with another coating layer underneath, or with another coating layer both under and over the coating layer derived from the coating composition as described herein.

After application to the substrate, the coating composition may be cured by any appropriate means. In some applications a cure of 425° F. or lower, such as 415 or lower or 400 or lower for 15 minutes or less, such as 5 minutes or less, or 4.5 minutes or less may be desired and can be achieved according to the present invention. Other cure conditions, such as higher temperature for shorter periods may also be appropriate depending on the application. For example, a temperature of 800° F. for 1 minute or less, such as 30 seconds or less may be desired.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" coating composition, "a" polyester, "a" crosslinker and the like, one or more of each of these and any other components can be used. As used herein, the term "polymer" refers to oligomers and both homopolymers and copolymers, and the prefix "poly" refers to two or more. (Meth)acrylic, and like terms, refers to both acrylic and methacrylic. Including, for example and like terms means including, for example, but not limited to. When ranges are given, any endpoints of those ranges and/or numbers within those ranges can be combined within the scope of the present invention. When maximum and minimum amounts are given, any such amounts can be combined to specify ranges of ingredients numbers within those ranges can be combined within the scope of the present invention. The word "comprising" and forms of the word "comprising", as used in this description and in the claims, does not limit the present invention to exclude any variants or additions. Additionally, although the present invention has been described in terms of "comprising", the processes, materials, and coating compositions detailed herein may also be described as "consisting essentially of" or "consisting of". All references herein to wt % or weight % refer to the weight percent based on solids, unless stated otherwise.

Accordingly, the present invention is further directed to a metal can, such as a food or beverage can, coated on at least a portion thereof with a coating, the coating being derived from a coating composition described herein. The food or beverage can may be filled with a food or drink material.

According to a further aspect of the present invention there is provided a method of coating a food or beverage can, the method comprising applying a coating composition to a surface of the food or beverage can. The method may further comprise the step of curing the coating composition to form a coating.

All of the features contained herein may be combined with any of the above aspects and in any combination.

For a better understanding of the invention, and to show how embodiments of the same may be carried into effect, reference will now be made, by way of example, to the following experimental data.

EXAMPLES

Example 1

| Component | Description | Solids (%) | Amount (wt %) | % Polyester on Polyester Solids |
|---|---|---|---|---|
| Polyester 1 (Tg = 65° C.)[1] | Polyester Resin | 51% | 38% | 74.6% |
| Vylon 560 (Tg = 7° C.)[2] | Polyester Resin | 33% | 20% | 25.4% |

-continued

| Component | Description | Solids (%) | Amount (wt %) | % Polyester on Polyester Solids |
|---|---|---|---|---|
| Maprenal BF 891/60B[3] | Amine crosslinker | 60% | 10% | |
| Phenodur PR516/60B[4] | Phenolic crosslinker | 60% | 5% | |
| Desmodur BL 2078/2[5] | Isocyanate crosslinker | 60% | 10% | |
| Additives | Additives | | 3% | |
| Solvents | Solvents | | 14% | |

[1] = Polyester formed from two diacids, a diol and a triol
[2] = commercially available from Toyobo
[3] = commercially available from Ineos
[4] = commercially available from Allnex
[5] = commercially available from Covestro

| Component | Description | % Solids | Amount (wt %) | % Polyester on Polyester Solids |
|---|---|---|---|---|
| Dynapol LH 318 (Tg = 20° C.)[1] | Polyester Resin | 55% | 45% | 92.5% |
| Vitel 2401 (Tg = 104° C.)[2] | Polyester Resin | 40% | 5% | 7.5% |
| Phenodur PR 899/60MPAC[3] | Phenolic crosslinker | 60% | 3% | |
| Durez 33310[4] | Phenolic crosslinker | 100% | 4% | |
| Phenodur PR 516/60B | Phenolic crosslinker | 60% | 3% | |
| Curaphen 40-852 B60 | Phenolic crosslinker | 60% | 7% | |
| Maprenal MF 986/80B | Amine crosslinker | 80% | 4% | |
| Desmodur BL 2078/2 | Isocyanate crosslinker | 60% | 4% | |
| Additives | Additives | | 5% | |
| Solvents | Solvents | | 20% | |

[1] = commercially available from Evonik
[2] = commercially available from Bostik
[3] = commercially available from Allnex
[4] = commercially available from Sumitomo Bakelite Co., LTD Example 3 (Comparative)

| Component | Description | % Solids | Amount (wt %) | % Polyester on Polyester Solids |
|---|---|---|---|---|
| PPG Polyester (Tg = 64° C.) | Polyester Resin | 50% | 40% | 78.1% |
| Vylon 660 (Tg = 55° C.)[1] | Polyester Resin | 33% | 17% | 21.9% |
| Phenodur PR516/60B | Phenolic crosslinker | 60% | 15% | |
| Cymel 1123[2] | Amine crosslinker | 98% | 4% | |
| Maprenal MF 986/80B | Amine crosslinker | 80% | 4% | |
| Additives | Additives | | 3% | |
| Solvents | Solvents | | 17% | |

[1] = commercially available from Toyobo
[2] = commercially available from Allnex Example 4 (Comparative)

| Component | Description | % Solids | Amount (wt %) | % Polyester on Polyester Solids |
|---|---|---|---|---|
| Vitel 2200B (Tg = 69° C.) | Polyester Resin | 37.8% | 30% | 38.9% |
| PPG Polyester (Tg = 89° C.) | Polyester Resin | 52% | 35% | 61.6% |
| Cymel 5010 | Amine crosslinker | 66% | 8% | |
| Phenodur PR612/80B | Phenolic crosslinker | 80% | 4% | |
| Additives | Additives | | 3% | |
| Solvents | Solvents | | 20% | |

Example 5 (Comparative)

| Component | Description | % Solids | Amount (wt %) | % Polyester on Polyester Solids |
|---|---|---|---|---|
| Duroftal PE 6607/60B (Tg = −6° C.) | Polyester Resin | 60% | 52% | 100% |
| Phenodur PR 516/60B | Phenolic crosslinker | 60% | 20% | |
| Desmodur BL 2078/2 | Isocyanate crosslinker | 60% | 15.5% | |
| Additives | Additives | | 0.5% | |
| Solvents | Solvents | | 12% | |

Enamel Rating

Samples were drawn down on ETP panels at 4 mg/in$^2$ and baked 12 minutes at temperature as shown. 307 ends were then fabricated from the panels with the coating on the interior. 4 second Enamel Raters were run using sodium sulfate with OTB surfactant solution on fabricated ends. The average result of three ends was recorded for each variable. Reported results are in mA. Result of 0 mA is desirable.

| Bake Temperature (° F.) | Example 1 | Example 3 |
|---|---|---|
| 410 | 0.6 mA | 12.0 mA |
| 420 | 0.7 mA | 57.2 mA |

Examples 6 through 12 in which the types and ratios of crosslinker are varied are detailed in the following table, along with the enamel ratings, tested at 400° F.

|  | Example | | | | | | | Polyester 1:Polyester 2 by wt % on polyester solids |
|---|---|---|---|---|---|---|---|---|
|  | 6 | 7 | 8 | 9 | 10 | 11 | 12 |  |
| Polyester 1 (Tg = 65° C.)[1] | 43 | 43 | 43 | 43 | 43 | 43 | 43 | 78.7%:21.3% |
| Polyester 2 (Tg = 7° C.)[2] | 18 | 18 | 18 | 18 | 18 | 18 | 18 | 78.7%:21.3% |
| Amine crosslinker[3] | 13 | — | 13 | 13 | — | 26 | 26 | 78.7%:21.3% |
| Phenolic crosslinker[4] | 13 | 26 | 26 | — | 13 | — | 13 | 78.7%:21.3% |
| Isocyanate crosslinker[5] | 13 | 13 | — | 26 | 26 | 13 | — | 78.7%:21.3% |
| Enamel Rating[6] | 0.6 | 13.4 | 1.7 | 2.2 | 0.9 | 0.8 | 1.3 |  |

[1] = Polyester formed from two diacids a diol and a triol
[2] = Vylon 560, commercially available from Toyobo
[3] = Maprenal BF891/60B, commercially available from Ineos
[4] = Phenodur PR516/60B, commercially available from Allnex
[5] = Desmodur BL 2078/2, commercially available from Covestro
[6] = Average of three separate measurements undertaken as described above, baked at 400° F.

Wedge Bend Test

Numerical measurement of the wedge bend test was undertaken by folding samples of known length to various degrees by, for example, some form impact on a tapered anvil. This was achieved by folding the coated metal loosely around a 6 mm diameter cylindrical mandrel and then impacting it by the fall of a wedge-shaped weight in a slide mechanism. The test piece is then immersed in acidified copper sulfate solution (25% solution in normal hydrochloric acid), which will stain any area where lacquer or coating breakdown has occurred. Continuous failure is defined as a complete adhesion loss along the bent edge of the metal. Peppering is defined as spot adhesion loss along the bent edge.

|  | Example 1 | | | Example 3 | | |
|---|---|---|---|---|---|---|
| Temperature | Continuous | Peppering | Total | Continuous | Peppering | Total |
| 380 | 31 | 13 | 44 | 15 | 47 | 62 |
|  | 39 | 0 | 39 | 20 | 32 | 52 |
|  |  | Average | 41.5 |  | Average | 57 |
| 390 | 34 | 4 | 38 | 44 | 18 | 62 |
|  | 29 | 23 | 52 | 31 | 49 | 80 |
|  |  | Average | 45 |  | Average | 71 |
| 400 | 34 | 10 | 44 | 75 | 25 | 100 |
|  | 25 | 10 | 35 | 69 | 31 | 100 |
|  |  | Average | 39.5 |  | Average | 100 |
| 410 | 32 | 4 | 36 | 100 | 0 | 100 |
|  | 28 | 8 | 36 | 100 | 0 | 100 |
|  |  | Average | 36 |  | Average | 100 |
| 420 | 28 | 27 | 55 | 100 | 0 | 100 |
|  | 37 | 4 | 41 | 100 | 0 | 100 |
|  |  | Average | 48 |  | Average | 100 |

Process Testing

Samples were drawn down on ETP and TFS panels at 4 mg/in² and baked for 12 minutes at 400° F. Coated panels were cut into 2"×4" coupons and placed in appropriate simulant solutions, half submerged (half headspace). Coupons were then retorted 90 minutes at 250° F. After retort, coupons were rinsed with DI water, dried, crosshatched, and taped with 610 tape. They were then evaluated for blush and adhesion. Blush was rated as "none", "slight", "moderate", or "severe". Adhesion was evaluated as a % loss.

| Retort Testing -ETP (Steam Retort, 90 min @ 250° F.) | | | Example 1 | Example 2 | Example 4 | Example 5 |
|---|---|---|---|---|---|---|
| Steam |  | Blush | None | None | Moderate | None |
|  |  | Adhesion (% loss) | 0% | 0% | 0% | 0% |
| 2% Salt | Headspace | Blush | None | None | None | None |
|  |  | Adhesion (% loss) | 0% | 0% | 0% | <5% |

| Retort Testing -ETP (Steam Retort, 90 min @ 250° F.) | | | Example 1 | Example 2 | Example 4 | Example 5 |
|---|---|---|---|---|---|---|
| | Submerged | Blush | None | None | Slight | Slight |
| | | Adhesion (% loss) | 0% | 0% | 0% | 100% |
| 3% Salt/ 2% Acetic Acid | Headspace | Blush | Slight | None | Moderate | Slight |
| | | Adhesion (% loss) | 0% | 0% | 0% | 0% |
| | Submerged | Blush | None | Moderate | Slight | Slight |
| | | Adhesion (% loss) | 0% | 0% | 0% | 10% |
| 1% Salt/ 1% Citric Acid | Headspace | Blush | None | None | Slight | Slight |
| | | Adhesion (% loss) | 0% | 0% | 0% | 5% |
| | Submerged | Blush | None | Slight | Moderate | Moderate |
| | | Adhesion (% loss) | 0% | 0% | <5% | 100% |

| Retort Testing - TFS (Steam Retort, 90 min @ 250° F.) | | | Example 1 | Example 4 | Example 5 |
|---|---|---|---|---|---|
| Steam | | Blush | None | Slight | None |
| | | Adhesion (% loss) | 0% | 0% | 0% |
| 2% Salt | Headspace | Blush | None | None | None |
| | | Adhesion (% loss) | 0% | 0% | 0% |
| | Submerged | Blush | None | None | None |
| | | Adhesion (% loss) | 0% | 0% | 0% |
| 3% Salt/ 2% Acetic Acid | Headspace | Blush | None | None | None |
| | | Adhesion (% loss) | 0% | 0% | 0% |
| | Submerged | Blush | Slight | Slight | None |
| | | Adhesion (% loss) | 0% | 0% | 0% |
| 1% Salt/ 1% Citric Acid | Headspace | Blush | None | None | None |
| | | Adhesion (% loss) | 0% | 0% | <5% |
| | Submerged | Blush | None | Slight | Moderate |
| | | Adhesion (% loss) | 0% | 0% | 100% |

Pack Results

Samples were drawn down on TFS panels at 4 mg/in$^2$ and baked 12 minutes at 400° F. for sheet bake or 18 seconds at 490° F. peak metal temperature for coil bake. 307 ends were then fabricated from the panels with the coating on the interior. Ends were packed in Acidified Tomato Paste adjusted to a pH=3.01 with citric acid and cans placed upright (coating variables exposed to headspace) in 120° F. hot room for 2 and 4 weeks. They were opened and evaluated for corrosion on a 0 to 10 scale. A-E are different regions of the 307 end; with A being the counter-sink, and E being the center of the end.

| KEY | | | | |
|---|---|---|---|---|
| | FAIL | POOR | GOOD | PASS |
| Test ratings | 0 to <5 | 5 to <7 | 7 to <9 | 9 to 10 |

TFS Coil Bake

| Weeks in Pack | Average Grade for Pack Results - Corrosion | | | | |
|---|---|---|---|---|---|
| | A | B | C | D | E |
| Example 1 | | | | | |
| 2 weeks | 10 | 10 | 10 | 10 | 10 |
| 4 weeks | 8.21 | 10 | 10 | 10 | 10 |
| Example 2 | | | | | |
| 2 weeks | 7.05 | 8.73 | 7.80 | 6.66 | 7.14 |
| 4 weeks | 4.60 | 5.79 | 6.38 | 5.49 | 6.00 |
| Example 4 | | | | | |
| 2 weeks | 0 | 0 | 0 | 0 | 0 |
| 4 weeks | 0 | 0 | 0 | 0 | 0 |

TFS Sheet Bake

| Weeks in Pack | Average Grade for Pack Results - Corrosion | | | | |
|---|---|---|---|---|---|
| | A | B | C | D | E |
| Example 1 | | | | | |
| 2 weeks | 10 | 10 | 9.67 | 10 | 10 |
| 4 weeks | 8.33 | 10 | 10 | 10 | 10 |
| Example 2 | | | | | |
| 2 weeks | 6.12 | 7.05 | 8.73 | 7.80 | 7.14 |
| 4 weeks | 4.76 | 5.79 | 6.38 | 5.49 | 6.00 |
| Example 4 | | | | | |
| 2 weeks | 0 | 0.84 | 2.99 | 3.67 | 5.57 |
| 4 weeks | 0 | 1.57 | 2.00 | 2.00 | 3.72 |

The invention claimed is:

1. A coating composition comprising
   a) a polyester blend comprising
      a first polyester material having a Tg of from 55 to 105° C., the first polyester material being present in the polyester blend in an amount of 60 to 90 wt % based on solids;
      a second polyester material having a Tg of from −10 to 25° C., the second polyester material being present in the polyester blend in an amount of 10 to 40 wt % based on solids; and
   b) a crosslinking system comprising
      i) an amine crosslinking material;
      ii) a phenolic crosslinking material; and
      iii) an isocyanate crosslinking material.

2. The coating composition according to claim 1, wherein the amine crosslinking material comprises a benzoguanamine material and/or a melamine material.

3. The coating composition according to claim 1, wherein the phenolic crosslinking material comprises a phenol/formaldehyde resin.

4. The coating composition according to claim 1, wherein the isocyanate crosslinking material comprises a blocked polyisocyanate material.

5. The coating composition according to claim 1, wherein the crosslinking system comprises the components i):ii):iii) in a ratio of 0.5-1.5:0.5-1.5:0.5-1.5 based on weight of solids.

6. The coating composition according to claim 1, wherein the first polyester material is present in the polyester blend in amount of 70 to 85 wt % based on solids.

7. The coating composition according to claim 1, wherein the first polyester material has a Tg of from 60 to 70° C.

8. The coating composition according to claim 1, wherein the second polyester material is present in the polyester blend in amount of 15 to 30 wt % based on solids.

9. The coating composition according to claim 1, wherein the second polyester material has a Tg of from 0 to 15° C.

10. The coating composition according to claim 1, wherein the polyester blend comprises a polyester material.

11. The coating composition according to claim 1, wherein the polyester blend is present in the coating composition in an amount of 25 to 70 wt % based on solids.

12. The coating composition according to claim 1, wherein the crosslinking system is present in the coating composition in an amount of 30 to 70 wt % based on solids.

13. The coating composition according to claim 1, wherein the coating composition further comprises a solvent.

14. The coating composition according to claim 1, wherein the coating composition further comprises a catalyst.

15. The coating composition according to claim 1, which further comprises a colorant.

16. A metal can coated on at least a portion thereof with a coating, the coating being derived from the coating composition of claim 1.

17. The metal can according to claim 16, wherein the metal can is filled with a food or drink material.

18. A method of coating a metal can, the method comprising applying the coating composition of claim 1 to at least a portion of a surface of the metal can.

19. The method according to claim 18 further comprising curing the coating composition to form a coating.

* * * * *